United States Patent [19]

Benteler

[11] 3,717,527
[45] Feb. 20, 1973

[54] METHOD OF MAKING AN INSULATED TUBE

[75] Inventor: Helmut Benteler, Bielefeld, Germany

[73] Assignee: Benteler-Werke AG, Paderborn, Germany

[22] Filed: Dec. 23, 1970

[21] Appl. No.: 101,024

Related U.S. Application Data

[62] Division of Ser. No. 763,311, Sept. 27, 1968, Pat. No. 3,570,545.

[30] Foreign Application Priority Data

Sept. 29, 1967 Germany.....................P 16 25 936.2

[52] U.S. Cl. .......................156/79, 161/160, 264/45
[51] Int. Cl. ................................................B32b 5/18
[58] Field of Search ...156/79; 138/140, 141; 264/45, 264/47; 161/160, 216

[56] References Cited

UNITED STATES PATENTS

| | | | |
|---|---|---|---|
| 3,615,977 | 10/1971 | Lehnert et al. | 156/79 |
| 3,578,520 | 5/1971 | Dolan et al. | 156/79 |
| 3,144,369 | 8/1964 | Foord et al. | 156/79 |
| 2,797,731 | 7/1957 | Carlson, Jr. | 161/160 X |
| 2,613,958 | 10/1952 | Richardson | 138/140 X |
| 3,390,704 | 7/1968 | Woodell | 161/216 X |
| 3,213,071 | 10/1965 | Campbell | 161/160 UX |

Primary Examiner—Benjamin A. Borchelt
Assistant Examiner—G. E. Montone
Attorney—Michael S. Striker

[57] ABSTRACT

A method of making an insulated tube. A steel tube is internally clad with corrosion-resistant material and externally jacketed with foamed plastic material having a volumetric weight which at most approaches 0.7 p/cm³. The resulting product is corrosion-resistant as well as thermally insulated and sound insulated.

8 Claims, 1 Drawing Figure

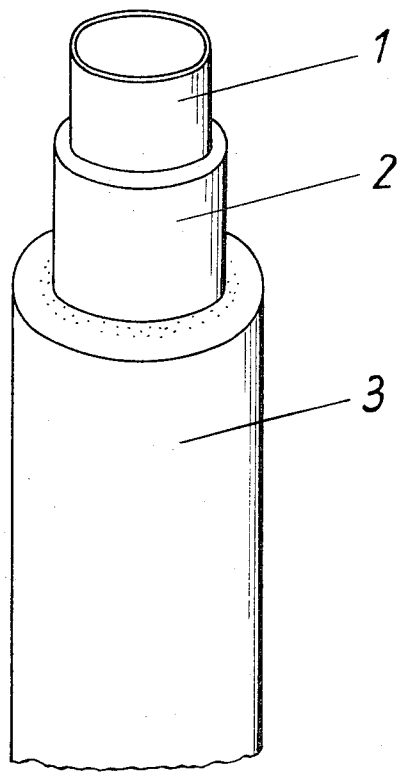

METHOD OF MAKING AN INSULATED TUBE

CROSS REFERENCE TO RELATED APPLICATIONS

This is a division of my copending application Ser. No. 763,311, filed Sept. 27, 1968, now U.S. Pat. No. 3,570,545 entitled "Insulated Tube And Method Of Making The Same."

BACKGROUND OF THE INVENTION

The present invention relates to tubes, and more particularly to insulated tubes. Still more particularly the invention relates to a method of making a tube or pipe which is particularly suitable for use in heating and water systems.

Pipes used in such systems, particularly in systems carrying water and, in the case of heating systems and warm-water installations carrying warm water, are subject to corrosion because of the natural salt and oxygen content of the water, particularly where warm water is concerned. This corrosion effect makes it impossible to use steel tubes, although these would of course be less expensive than copper tubes. On the other hand, copper tubes are not entirely satisfactory either because while they are resistant to corrosion they have relatively low mechanical strength. Therefore, in order to be able to withstand mechanical stresses and also the water pressure prevailing in the system, they must have considerably greater wall thickness than a comparable steel tube. This necessitates the use of larger quantities of copper for copper tubes than steel which would be needed in steel tubes if such could be used. This is another disadvantage because the price of copper is considerably higher than that of steel with a corresponding increase in the price of the tubing.

A further disadvantage of tubes which are currently in use for these purposes is the fact that they have either none, or at most inadequate sound and thermal insulation. In many instances, for example in apartment installations, the noise of water flowing through the tubes is highly objectionable, and it of course goes without saying that the lack of thermal insulation is a particular disadvantage in warm-water carrying tubes because of the heat loss and resultant economic expenditures.

There exists in the prior art an attempt to overcome some of these disadvantages by providing a copper tube with a homogeneous solid-walled synthetic plastic jacket of substantially star-shaped internal cross section. In other words, the inner surface of the jacket facing the outer surface of the copper tube is provided with longitudinally extending ribs and corresponding grooves, with the ribs abutting the outer surface of the copper tube. However, the resulting product does not overcome the disadvantages outlined above, because it still consists of solid copper on the one hand while on the other hand the jacket can be very easily and inadvertently withdrawn from the copper tube, a fact which is very disadvantageous during installation.

It is, accordingly, an object of the present invention to provide a method of making an insulated tube which is not possessed of the aforementioned disadvantages.

A further object of the invention is to provide a method of making a tube of the character in question which is simple and inexpensive.

SUMMARY OF THE INVENTION

In accordance with one feature of my invention, I provide a method of making an insulated pipe wherein I interiorly align a tubular element of corrosion-prone material with a layer of corrosion-resistant material which is bonded thereto. Thereupon I jacket the tubular element with an outer tubular layer of foamed synthetic plastic material having advantageously a volumetric weight at most approaching 0.7 p/cm$^3$ (pond per cubic centimeter).

Advantageously the outer tubular element consists of bendable steel which is relatively inexpensive and provides the requisite mechanical strength. The inner layer may consist of a synthetic plastic material, for instance polyolefin, it may consist of a layer of copper, a layer of rust-free steel, or another suitable material. Because it can be relatively thin the use of this inner lining material will be inexpensive. On the other hand, the use of foamed plastic material for the jacketing, the material having a volumetric weight at most approaching 0.7 p/cm$^3$ provides sound and thermal insulation which is considerably better than that which could be obtained by making such a jacket of solid non-foamed plastic material while requiring at most the same quantity of plastic material. Furthermore, the use of foamed plastic material makes it possible to provide the jacket on the outer surface of the steel tube so tightly that it cannot be withdrawn or moved longitudinally with respect to the steel tube, regardless of the forces tending to do so.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a somewhat diagrammatic view of a tube made by the method according to my invention.

DESCRIPTION OF THE PREFERRED EMBODIMENTS

As indicated in the drawing, the exemplary tube comprises an inner tubular layer or element 1, an outer tubular layer or element 2 and a jacket 3 which is also of tubular configuration. In the illustrated embodiment it will be assumed that the tubular element 1 is a copper tube, the tubular element 2 a steel tube and the jacket 3 a layer of foamed synthetic plastic material. In constructing this tube the inner element 1 may be introduced into the outer element 2 and the two may then together be subjected to downdrawing whereby to reduce their diameter and at the same time effect pressure-diffusion bonding at the interface between the elements 1 and 2. Thereupon the resulting semi-finished product will be subjected to annealing at temperatures on the order of 950°C, preferably 930°C. This results in the production of a homogeneous composite tube which thereupon is provided with jacket 3.

The manner in which the jacket 3 can be applied is already known in the art and need not be further described. It is pointed out, however, that the jacket 3 may consist of any foamable synthetic plastic material, and I have found polyolefin particularly suitable with azo-dicarbonamide being used as a blowing agent. The jacket 3 is so tightly bonded with the outer surface of the tubular element 2 that it cannot slide with respect to the element 2. It provides excellent sound and thermal insulation.

I prefer to foam the material of the jacket 3 to a specific weight or volumetric volume less than 0.5 p/cm³ and, in accordance with a further concept of my invention, it is contemplated to add to the material of the jacket 3 between substantially 6 and 15 parts by weight of a light-weight thermal insulating substance, such as asbestos or diatomite powder.

I have already pointed out the advantages of the jacket 3 consisting of the foamed synthetic plastic material. I should still further point out that by foaming this material to a volumetric weight of at most 0.7 p/cm³, and preferably less than 0.5 p/cm³, I require no more plastic material than would be necessary for making a solid jacket but obtain considerably improved sound and thermal insulating properties. A suitable material is polyolefin.

I have also mentioned that in place of copper for the inner element 1, I may use other materials, such as a homogenous synthetic plastic material, particularly polyolefin, or an acid and alkali-resistant chrome-nickel steel, particularly of the type known as V2A-steel having a chrome content of substantially 18–20 percent and a nickel content of substantially 6–8 percent. If I use this type of steel for the tubular member 1, then I advantageously provide the material of the tubular member 2 as a strip or sheet, onto one surface of which a thin foil or layer of the material of which the inner tubular element 1 is to consist is bonded, for instance by roller-bonding, whereupon the resulting laminated sheet or strip is rolled or deformed so as to provide a tube which is then longitudinally welded.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of making an acoustically and thermally insulated pipe, comprising the steps of providing a tubular element having an exposed outer surface; and applying to said outer surface a synthetic plastic polyolefin substance including azo-dicarbonamide as a blowing agent, and activating the azo-dicarbonamide blowing agent after said synthetic plastic polyolefin substance including said azo-dicarbonamide blowing agent has been applied to the outer surface of said pipe, so as to foam said plastic polyolefin substance in situ and thus surround said tubular element with a continuous tubular jacket of foamed closed-celled sound and thermally insulating synthetic plastic polyolefin material having a volumetric weight at most approaching 0.7 p/cm³ and bonded to said outer surface in surface-to-surface contact therewith.

2. A method as defined in claim 1, wherein said tubular element is of corrosion-prone material; and further comprising the step of lining said tubular element internally with a layer of corrosion-resistant material bonded thereto.

3. A method as defined in claim 2, the step of lining said tubular element comprising roller-bonding to a flat layer of corrosion-prone material a layer of chrome-nickel steel, deforming the resulting lamination into a tubular shape with the layer of steel facing the interior, and welding the longitudinally extending edges of the lamination together to thereby form a lined tubular element.

4. A method as defined in claim 2, the step of lining the tubular element comprising telescoping thereinto a tubular member of corrosion-resistant material to thereby obtain a double-walled tube, and subjecting the double-walled tube to down-drawing whereby to reduce the cross-sectional dimension of the tube while simultaneously effecting pressure-diffusion bonding of the tubular member with the tubular element.

5. A method as defined in claim 4, the tubular element consisting of steel and the tubular member consisting of copper; and comprising the step of annealing the tubular element subsequent to down-drawing and prior to jacketing.

6. A method as defined in claim 5, the step of annealing comprising subjecting the tubular element to elevated temperature of between substantially 930°C and 950°C.

7. A method as defined in claim 2, wherein said layer of corrosion-resistant material consists of copper.

8. A method as defined in claim 1, wherein said tubular element consists of steel.

* * * * *